United States Patent [19]

Simkus et al.

[11] Patent Number: 4,819,818

[45] Date of Patent: Apr. 11, 1989

[54] RANDOM NUMBER GENERATOR

[75] Inventors: John J. Simkus, 9N831 Beckman Trail, Elgin, Ill. 60123; George Dell, Morton Grove, Ill.

[73] Assignee: John J. Simkus, Huntley, Ill.

[21] Appl. No.: 47,114

[22] Filed: May 8, 1987

[51] Int. Cl.[4] .................................... G06F 1/02

[52] U.S. Cl. .................... 273/138 A; 273/148 R; 364/410; 364/707; 364/717

[58] Field of Search .................... 273/148 R, 138 A; 364/217, 410, 707, 717

[56] References Cited

U.S. PATENT DOCUMENTS

| | | | |
|---|---|---|---|
| 4,431,189 | 2/1984 | Wiencek et al. | 273/138 A |
| 4,665,502 | 5/1987 | Kreisner | 364/717 X |
| 4,692,863 | 9/1987 | Moosz | 273/138 A |
| 4,713,787 | 12/1987 | Rapp | 364/717 |

FOREIGN PATENT DOCUMENTS

| | | |
|---|---|---|
| 2072395 | 9/1981 | United Kingdom . |

*Primary Examiner*—Carlton R. Croyle

*Assistant Examiner*—David W. Scheuermann

*Attorney, Agent, or Firm*—Douglas B. White

[57] ABSTRACT

There is provided a micro-computer driven random data selection system. The processor of this system is arranged to read a matrix of switches to determine a range of numbers and to establish a software controlled sequencing routine corresponding to this range. The interrupt terminal of the micro-computer is used to sense the activation of the system and causes the number selection. The software of the present invention presets the internal counters to the requisite range in response to the status of the switch matrix and displays that range in one of the two LED displays. Following sensing of the range, the computer starts the sequencing or counting and continuously sequences until deactivated. When the "roll" switch is operated, the computer samples and displays the last number in the sequence. Data for controlling the displays and loading the counter is stored in memory locations and the address for this data is developed from an index generated from the switch matrix inputs.

18 Claims, 4 Drawing Sheets

RANDOM NUMBER GENERATOR

BACKGROUND OF THE INVENTION

1. Field of the Invention

The present invention relates generally to electrical apparatus for generating random numbers and more particularly to apparatus of the type designed to imitate the roll of dice. Moreover, this invention relates specifically to apparatus for simulating multiple ranges of multisided dice and apparatus capable of generating dual numbers to simulate the roll of two die at the same time.

2. Description of the Prior Art

Prior methods for generating numbers, often called random selection devices, have historically been manual, that is solid multisided objects having numbered facets. These are generally thrown by the user and arbitrarily come to rest on a side and thereby display a selected number. With the electronic age, many devices have been proposed to duplicate the number selection electronically and to enhance the entertainment value of such.

One of such electronic devices is illustrated in U.S. Pat. No. 4,641,840 which describes a plastic cube supporting a numeric display on each of six facets. Within the cube, an electronic circuit generates a random number on the sensing of motion of the cube. The circuit ceases the number generation and displays a selected number upon termination of the motion.

Similarly, in U.S. Pat. No. 3,580,581 there is described an electrical apparatus for determining a random number. This patent describes a popular means to select a random number including starting a counter to cycle through the range of numbers and to cease that count and display the last number in the sequence when the count is interrupted.

The use of the counter circuit to cycle the output is shown also in U.S. Pat. No. 3,659,853 where a free-running unijunction oscillator is connected to a ring counter. A similar approach is shown in the publication *Roll Your Own Electronic Dice,* Popular Mechanics, March 1979, where a counter is described and connected to display devices. The circuit commences counting when the "roll" button is pushed and ceases counting when the button is released, displaying the last number in the count.

In another method, pairs of electronic die have been described to be "rolled" together. In the U.S. Pat. No. 3,791,650 there is described a dual display system with each display driven by separate oscillators and counters. Thus when a start button is switched to the "on" position the counters begin. When the button is switched off, the counters slow down and finally terminate counting, causing the display of the last number counted. Since the circuit parameters vary between the two counter and oscillator circuits, the numbers generated at each display will be different. Another version of the two die system is described in the U.S. Pat. No. 4,034,988 where an unbalanced multivibrator is used to generate unequal clock pulses for input to counter circuits which in turn drive the displays.

Recently, in U.S. Pat. No. 4,431,189, there was described an electronic number generator which was capable of being "set" for the generation of a plurality of distinct multisided die. In this device there is provided a clocking circuit, a decade counter, a switch connecting the clock to the counter to initiate the counting sequence, a display, and a multiposition switch for selecting which of a predetermined range of die sides will be involved.

The present invention differs from these prior systems and devices by providing means for computing a random number for any range of die sides, computing numbers for dual die at the same time without duplicate circuitry, and using the same switch for activating the circuitry which determines the "roll", thereby making the device more economical and compact.

SUMMARY OF THE INVENTION

Generally there is provided a micro-computer driven system having display devices connected to port lines thereof. The processor of this system is arranged to read a matrix of switches to determine the range of the die sides and to establish a software controlled sequencing routine corresponding to this range. Moreover, this device is responsive to the interrupt terminal of the micro computer to sense the activation of the system and to begin the "roll". In yet a further aspect of the invention, the circuit senses from the range setting whether to "roll" one or two die.

This is accomplished by connecting a micro-computer, such as the Motorola 6804, to receive signals from a switch matrix on defined I/O lines which are monitored by the microprocessor. Remaining I/O lines are defined as outputs and are connected to line driving transistors to operate light emitting diode displays. The software programming of the present invention presets the internal counters to the requisite range in response to the switch matrix selection and displays that range in one of the two L.E.D. displays. Following sensing of the range the computer starts the sequencing or counting, and repeatedly cycles through the sequencing routine. When the "roll" switch is operated, the computer displays the current number in the counter sequence.

Operation in the two die mode is accomplished by setting the range twice in sequence. When this is done, the computer senses the two die mode and samples the output of two internal software controlled counters. Pressing of the "roll" button causes selection of the first number, while release of the "roll" button causes the number for the second die to be selected and both numbers displayed. In yet a further aspect of the invention there is provided an audible "beeper" which generates a beeping sound to indicate range selection (low tone) and number selection (high tone).

DESCRIPTION OF THE PREFERRED EMBODIMENT

Figure 1:
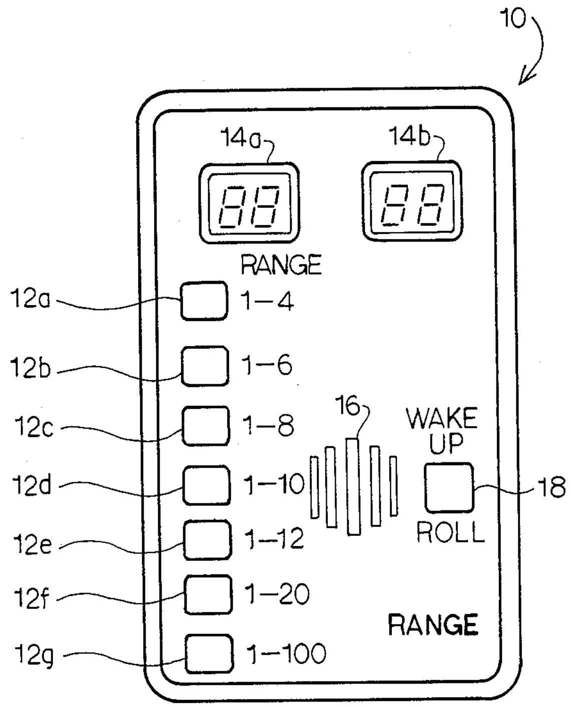
FIG. 1 depicts an example of the physical enclosure of the electronic apparatus of the present invention showing the switch matrix, the "roll" switch, and the displays.

Turning first to FIG. 1 there is shown a housing 10 for enclosing the electronic circuitry of the present invention. This housing has defined thereon a matrix of range selection switches 12a–12g. In the preferred embodiment, this matrix would select specific ranges of die sides, but as more fully explained below this matrix may be read by the micro-computer to set the software controlled sequencing counters at any desired numerical range. Display devices 14a and 14b such as light emitting diode displays are located in prominent positions on the face of this housing. Speaker openings 16 are provided for fascilitating the use of a piezoelectric speaker to audibly indicate range and number selection. Actuation or "wake up" of the micro-computer, as well as the die "roll" command is performed by the operational switch 18.

Figure 2:
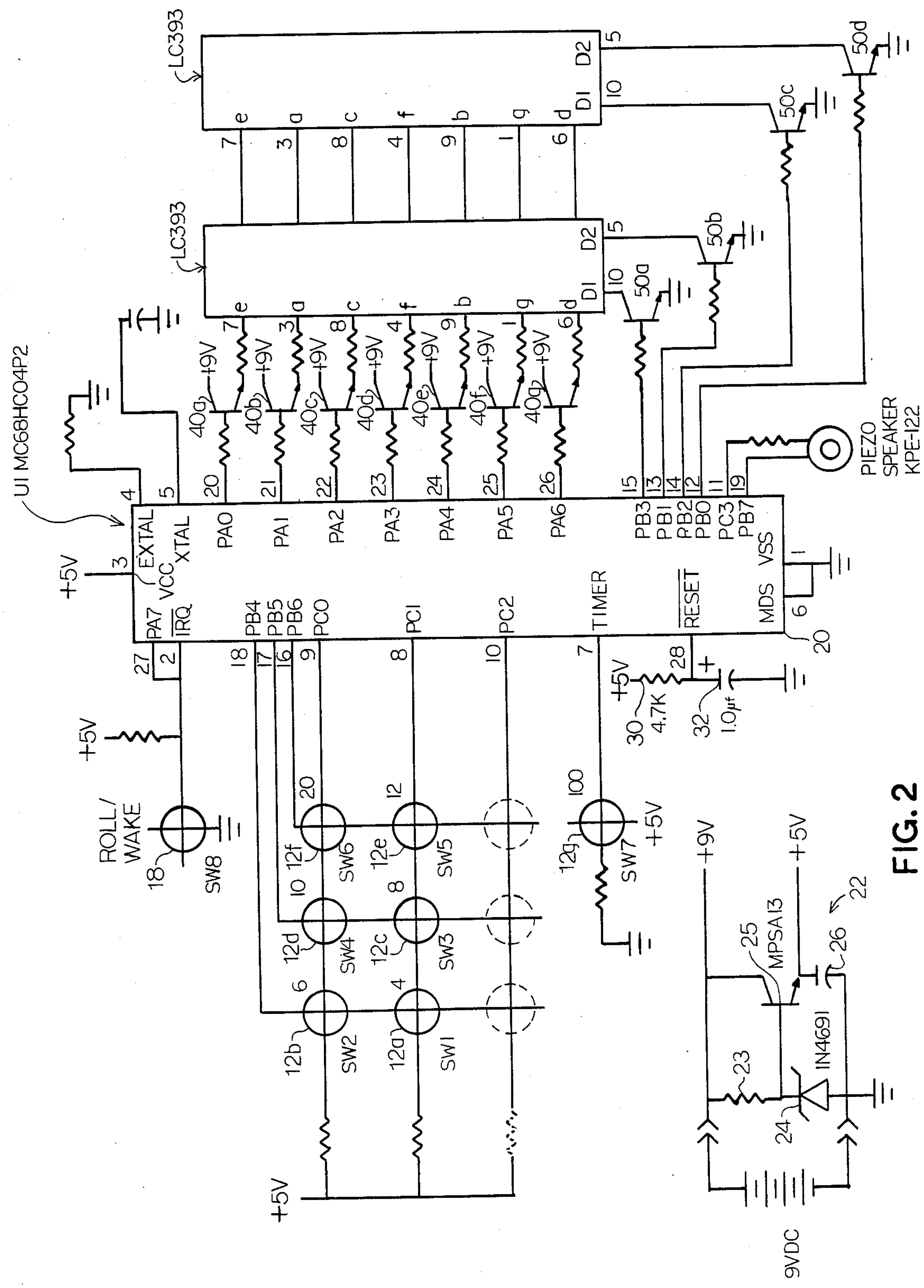
FIG. 2 is a schematic of the micro-computer circuit of the present invention housed within the casing of FIG. 1.

Turning now to the schematic shown in FIG. 2, the electrical function of the micro-computer circuit may be explained. Principally there is shown a Motorola microcomputer 20, known in the industry as an MC68HC04P2, which is of the 6800 series manufactured and sold by Motorola, Inc. Specific electrical information as well as programming instructions are available from Motorola, Inc., and can be ordered as Motorola semiconductor technical data (MC6804J1/D) from Motorola, Inc., P.O. Box 20912, Phoenix, Ariz. 85036.

This micro-computer is powered by a 5 volt power supply 22 designed using a 9 volt battery and is provided with the network shown to reduce the voltage to 5 volts for use by the micro-computer. This network comprises a resistor 23, a diode 24 and a transistor 25 having a capacitor 26 connected from emitter to ground. This configuration provides safe and stable power to the circuit and delivers 9 volts for operation of the display circuit as described more fully below, while at the same time consuming very little power itself.

To control the state of the micro-computer during start-up there is provided a resistor 30 connected from power to the reset pin of the micro-computer and a capacitor 32 to ground. This provides a time delay at initial power-up to allow the internal clock generator to stabilize. Following this delay the reset pin is pulled high to cause a reset of the system. In one embodiment of the circuit, the resistor is set at 4.7K Ohms and the capacitor is set at 1.0 microfarads.

The switch matrix of the present invention is connected to certain I/O port lines and the Timer I/O pin to generate range selection. Particularly, a common connection for switches 12b, 12d, and 12f is connected to the Port C0 pin (pin 9 of the micro-computer), and their other connections to Port B4, Port B5, and Port B6, respectively. Similarly, a common connection for switches 12a, 12c, and 12e is connected to the Port C1 pin (pin 8 of the micro-computer), and their other connections to Port B4, Port B5, and Port B6, respectively. Possible expansion for three more switches in the matrix is provided with the Port C2 pin (pin 10 of the micro-computer). Switch 12g is shown connected to the Timer input (pin 7) of the micro-computer, with its other connection to power. With this simplified switch matrix, the micro-computer is able to differentiate between the selected ranges by monitoring and decoding these inputs.

Particularly, with switch 12a (SW2) depressed the micro-computer would detect the condition by generating a low signal on output PB4 and testing the condition of input PC1. If a low signal is found on PC1, then the range indicated by switch 12a would be assumed by the micro-computer. Detection of the condition of the remaining switches 12b–12e is done similarly. In the present embodiment of the invention, switch 12b is arranged to indicate a range of six sides of a die; 12c, 8 sides; 12d, a range of 10 sides; 12f, a range of 20 sides; 12a, a range of 4 sides; and 12e, a range of 12 sides. Testing of switch 12g to indicate the range of 1–100 is done by monitoring the Timer input of the micro-computer. In this chip the input on the Timer pin (pin 7 of the micro-computer) is held in memory location 9 as a flag. The microcomputer under control of the software, checks this flag and thereby determines whether to assume the range of 1–100.

When any switch in the matrix is pressed, the micro-computer develops an index corresponding to the range required. In this embodiment, since the switches are each scanned in a particular order, the micro-computer maintains a count which is incremented after each switch is checked. The count or index is then translated to an address into a table of output display data. This data is directed to the output lines and displayed to indicate the range selected. A second table of information containing range information for use by the counter of micro-computer is also programmed into memory and the appropriate address is developed from the index. In the present embodiment, this address is developed from the address for the range output table since this table is a second fixed offset away from the range output table. In the embodiment shown, a fixed offset is added to the index for entry into the range output data table, and a fixed offset is used to increment that address to enter the table of range values for use by the counters.

It is to be understood that the apparatus and method of the present invention is useful with other switch matrix decoding interconnections and with other methods of setting the internal counters. These methods may include such modifications as reading a switch as a numeric digit and setting the program counters according to the number read, or electrically incrementing a counter in accordance with the operation of an input switch such that the range is set by the level of count established during the interval of switch actuation.

Directions to the micro-computer system to "wake-up" the system and to start operation is provided through the interrupt line (pin 2 of the micro-computer). Operation of the "roll" button 18 generates an interrupt signal to the interrupt and also directs an input data signal to the Port A7 input line (pin 27 of the micro-computer). As described in more detail in connection with the programming, operation of the "roll" button first activates the system. After activation, operation of the "roll" button causes sampling of the counters and display of output data.

Clocking of the micro-computer is provided by an internal clock which is accessible by connecing the XTAL input (pin 5 of the micro-computer) to a resistor/capacitor circuit, as shown, and connecting the EXTAL input (pin 4 of the micro-computer) to ground through resistance as shown.

When operating under the programming hereafter discussed, the micro-computer generates outputs on Port A I/O lines PA0 to PA6 (pins 20 through 26 of the micro-computer). These outputs are boosted by line driving transistors 40a to 40g, arranged to drive the display from their emitters through current limiting resistors. In the present embodiment, there are provided transistors known as the 2SC1815 for providing this amplification. These are connected to the micro-computer through 10K Ohm resistors at their bases and connected to the 9 volt power supply at their collectors. The value of the current limiting resistor can be varied depending on the brightness desired in the L.E.D. display.

The light emitting diode display devices are connected in parallel to the boosted Port A data output lines and gated to receive data by digit selection signals at the Port B data terminals PB0, PB1, PB2 and PB3 (pins 12 through 15 of the micro-computer). These gating instructions are boosted by transistors 50*a* to 50*d*, as shown, to inputs D1 and D2 of each of the display devices to select which display device and which digit is activated. In the preferred embodiment, the digits are scanned or strobed to flash the digits at an imperceptible rate to conserve power. The display devices used in the preferred embodiment are sold as LC393 common Cathod L.E.D. displays by L.E.D. TECH, and are seven segment, two digit displays.

Figure 3:
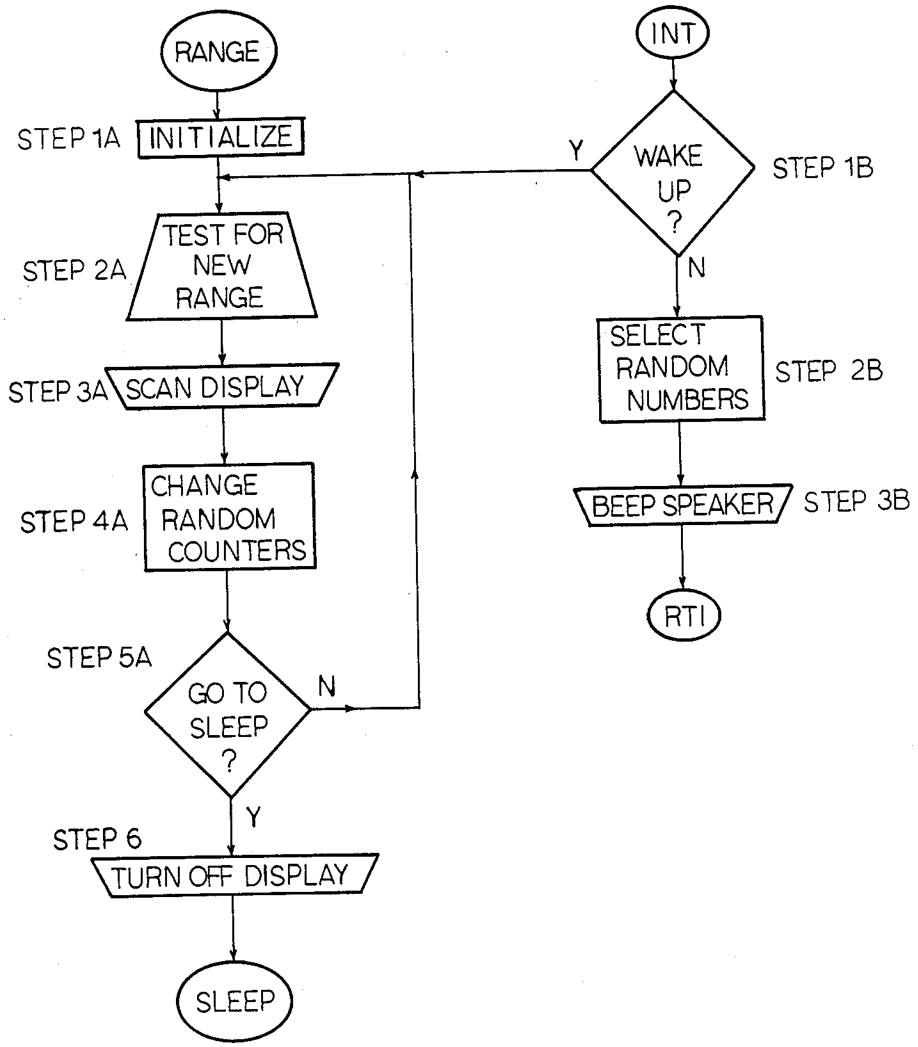
FIG. 3 is a flow diagram of the main routine performed by the micro-computer of FIG. 2.

Turning now to the programming and first to FIG. 3 of the drawings, there is illustrated a flow diagram of the main routine of the present system.

In step 1A the micro-computer enters a subroutine of initialization procedure which establishes the constants, flags and starting values for the system software.

In step 2A the micro-computer is directed to monitor the micro-computer inputs and test for range information. The sensing and determination of range information is accomplished by pulling a line low, which line is common to three switches of the matrix, and then sequentially testing the three input lines connected to the three switches, individually. If a low signal is detected (for ranges of 4–20) then the computer exits the switch testing routine and, using an index developed in the switch testing routine, enters a table in memory to obtain appropriate output data for driving the displays to indicate the range. The entry address into the range output data table is determined by adding a predetermined offset to the index and using that address for the range output data table. Data used in loading the range into the counters is held in a second table in memory. The address for the data in this range table is determined by adding a second fixed offset to the address used to enter the range output table. In this embodiment, the fixed constant 9 is used as the second offset.

In step 3A the processor produces the display output and scans the display to strobe the L.E.D. output. The display output is generated by reading the output data from the output data table and directing the data to Port A lines 0–6 to drive the seven segments of each of the displays. The scan or strobe feature is accomplished by storing data for output to Port B lines PBO, PB1, PB2 and PB3 in sequential memory locations. These lines then are connected to control the digit selection of the display devices. During display function, a software counter increments through a range and an address in memory is developed from this counter. The digit selection signal is then read from the associated memory location to drive the displays.

In step 4A the processor is instructed to begin a subroutine that changes the count in the counters, and this routine will be described in more detail below. Since the computer quickly sequences through the main loop, the counters/sequencers are virtually continuously being changed at an imperceptible rate. This feature allows for the sampling of the state of the counters at any time without waiting an arbitrary time for a "roll" to be accomplished.

In step 5A the processor begins a routine to sense whether there is any activity required by the system and, if not, to reduce power and deactivate the circuitry to save the battery charge. If there is still activity, then the processor is directed to return to the beginning. If there is no activity, then the processor is directed to turn off the circuitry and wait for a "wake-up" signal. During the "power down" phase, limited power is provided to the micro-computer to retain memory.

In the second series of steps shown in FIG. 3, there is shown a flow diagram illustrating the subroutine to which the computer jumps on sensing of an interrupt. Since the "roll" switch is connected to the micro-computer interrupt, this routine will be entered each time the "roll" switch in pushed.

In step 1B of this subroutine, if the system is in the "power down" condition then sensing of the interrupt (pressing of the "roll" button) causes the system to wake up and directs the micro-computer to the main loop to start the counters running.

Step 2B of the interrupt routine is entered when the interrupt is sensed and the system is already active. This step selects or samples the current state of the counters, the first counter being sampled on the initiation of the interrupt signal, and the second counter being sampled on the termination of the interrupt.

Step 3B of this routine jumps the micro-computer to the routine for operating the speaker. This generates a high tone indicating that a number has been selected.

Figure 4:
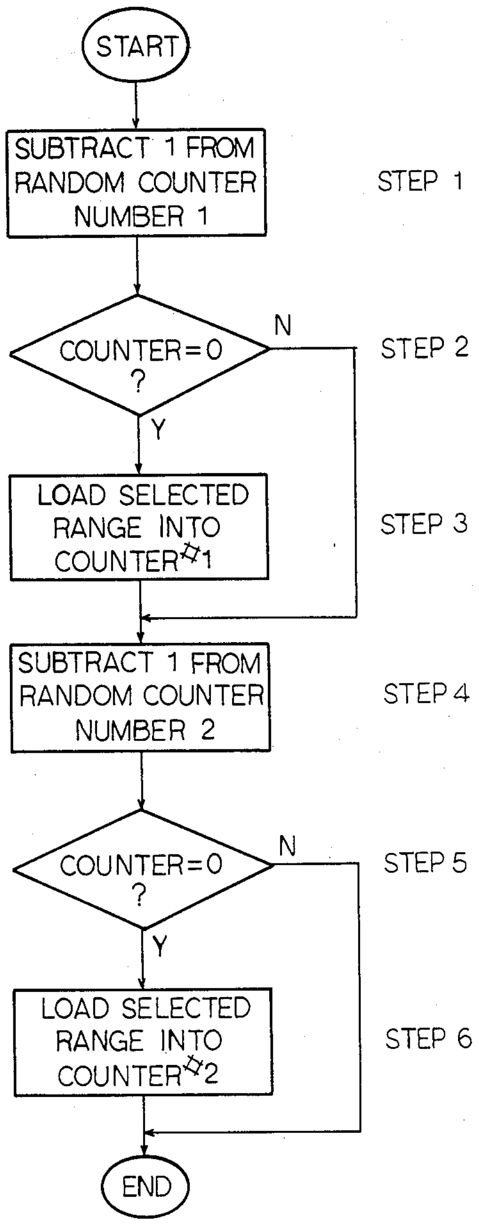
FIG. 4 is a flow chart of the routine of the invention for operating the number counters.

The routine for changing the count in the counters is illustrated by the flow diagram shown in FIG. 4. In step 1 of this routine the processor is directed to subtract 1 from the first counter. In step 2 the processor checks to determine whether the count in the first counter is at zero; if it is, then the processor (step 3) loads the current range information into the counter. This procedure is then duplicated for the second counter (steps 4–6). This routine is used to initialize and decrement the counters and is jumped to from the main program to continuously keep the counters changing. Since the program cycles through the main loop at a high cycle rate, the counters are constantly changing. While both counters are in fact syncronized, the actual selection of the numbers assures randomness. This is due to the fact that in the two die mode, the first number is chosen on the pushing of the "roll" button and the second number is chosen on release of the "roll" button. Due to the high rate of sequencing continuously occurring, the selection of the first number certainly cannot be predicted, and since the second number is tied not only to the randomness of the first time interval but also to an arbitrary interval between the first and second number selection, it cannot be predicted either. Display of the selected number is accomplished in a manner similar to the display of the range information. The count sampled from the counter is used as an index to develop an address to a memory having a table of output data. The data read from this table is then used to drive the seven segment display.

The particular programming used in this embodiment of the invention is summarized as follows:

| | | | | |
|---|---|---|---|---|
| OCOO | 8D 31 | RESET | JSR | INIT |

This instruction initializes the pointer and variables in memory as well as selecting which IC pins are inputs and which are outputs.

| | | | | | | |
|---|---|---|---|---|---|---|
| OC08 | BO | 09 00 | MAINLP | MVI | SWCNT,#0 | |

This line is the entry point for the main program loop.

| | | | | | |
|---|---|---|---|---|---|
| OCOB | D4 | 0100 | SCANSW | BCLR | 4,PB |
| to | | | | | |
| OCAO | 9C | B8 | | JMP | GOTSW |

This series of instructions is responsible for reading the switch matrix and to determine whether one or two random numbers will be displayed. The 9 switches are placed in a 3 by 3 matrix to reduce the number of inputs to the CPU. Three signals are used for inputs and three signals are used as strobe outputs. Reading the matrix of switches requires three repeats of: pull a strobe line low, read three switches and release the strobe line. If no switches are pressed the instruction flow is redirected to the next section. If a pressed switch is found, an index for that switch is retained and a range value is fetched from a table corresponding to that index. The amount of time from the last range selection is also evaluated here to determine whether one or two die mode is desired. The program then waits for the switch to be released before continuing.

| | | | | | | |
|---|---|---|---|---|---|---|
| OCA2 | C7 | 09 | 27 | TIMER | BRCLR | 7,TCONT,NOSW2 |
| to | | | | | | |
| OCCC | 8E | 6B | | NOSW2 | JSR | DSPSCN |

This series of instructions reads the tenth range switch and if it is pressed, sets the variables for a single one hundred sided die.

| | | | | | |
|---|---|---|---|---|---|
| OCCE | F8 | 84 | BMPRND | LDA | RNDRNG |
| to | | | | | |
| OD10 | 9E | 1D | BMP2 | JMP | BM2RET |

These instruction lines change the count in the two counter sequencers once every main loop (MAINLP). By quickly looping through all the range possibilities, there will be an equal weight of chance for "roll" of the die. The counters are initially loaded with the maximum value from the range data table and then decremented (reduced by one) with each pass through the loop. Once a counter decrements below its minimum value, the maximum value is reloaded and the process repeats.

| | | | | | |
|---|---|---|---|---|---|
| OD12 | FF | 8C | OFFTMR | DEC | OFFDLY |
| to | | | | | |
| OD2F | 9C | 08 | | JMP | MAINLP |

This group of instructions is responsible for automatic power down after a predetermined amount of time, and in the preferred embodiment this is set at ten seconds of no use.

The remainder of software is in the form of subroutines that are called from different points in the program above.

-continued

| | | | | | | |
|---|---|---|---|---|---|---|
| OD31 | BO 04 | 7F | INIT | MVI | PAC,#$7F | |
| to | | | | | | |
| OD68 | B2 | | | | RTI | |

This subroutine sets I/O, initializes variables, flags and beeps the speaker.

| | | | | | | | |
|---|---|---|---|---|---|---|---|
| OD69 | BO | 88 | 19 | BEEPH | MVI | PITCH,#25 | |
| to | | | | | | | |
| ODBA | 9E | 4B | | BEEP7 | JMP | BP7RET | |

This is the speaker subroutine. BEEPH produces the high tone and BEEPL makes the low tone.

| | | | | | |
|---|---|---|---|---|---|
| ODBC | F9 | 98 | INT | STA | ATEMP |
| to | | | | | |
| OE6A | B2 | | | RTI | |

This group of instructions provides two functions: wake up and "roll".

When the CPU is powered down (sleep mode) pressing the roll/wake SW8 push button will wake the CPU and display the last selected range. Releasing SW8 then displays the last "roll" to resolve any disputes.

If the CPU is in operation mode, pressing the roll-/wake SW8 button will display the current range(s) and select a random number. Releasing the roll/wake button will optionally select a second random number or display the selected random numbers.

| | | | | | | |
|---|---|---|---|---|---|---|
| OE6B | BO | 04 | 7F | DSPSCN | MVI | PAC, #$7F |
| to | | | | | | |
| OEB6 | B3 | | | | RTS | |

This subroutine takes care of refreshing the multiplexed L.E.D. display. To conserve power, only one digit of the display is on at any one time. Each digit is scanned at such a high rate that all 4 digits appear to be on at the same time.

From the foregoing description, it will be apparent that modifications can be made to the apparatus and method for using same without departing from the teaching of the present invention. Accordingly, the scope of the invention is only to be limited as necessitated by the accompanying claims.

We claim:

1. Electronic apparatus for generating data selection in response to operational signals within preselected range, comprising:

micro-computer processor means;

range selection means coupled to said processor means for selecting a dual range of data for simultaneous data selection sequencing operations;

sequencing means under control of said processor means for concurrently sequencing through said data selection sequencing operations;

switch means for causing said processor means to terminate the first of said data selection sequencing operations in response to the push of said switch means and to select data therefrom, and to terminate the second of said data selection sequencing operations in response to the release of said switch means and to select data therefrom; and display means under control of said processor means for displaying said selected data.

2. The apparatus of claim 1 wherein said range selection means comprises a plurality of switches coupled to input/output lines of said micro-computer processor means and arranged to preset said range.

3. The apparatus of claim 1 further comprising a momentary switch for actuating said circuitry, wherein said switch is also arranged to provide a signal to said processor to initiate said sequencing.

4. The apparatus of claim 1 wherein said sequencing means is periodically sequenced by said processor means during processing tasks to simulate continuous sequencing operation.

5. The apparatus of claim 4 wherein said processor means is arranged to step said sequencing means each time said processor means processes the main operation loop of the system.

6. The apparatus of claim 2 wherein said range selection means comprises:

means for decoding a switch input;

means for generating an index corresponding thereto; and means for determining said range in response to said index.

7. The apparatus of claim 6 further comprising range table memory means wherein defined range data is stored at specific address locations therein, and further comprising means for developing said address location from said index, wherein said range data is used to control said sequencing means.

8. The apparatus of claim 6 further comprising an output table memory wherein defined output data is stored at specific address locations therein, and further comprising means for developing said address location from said index.

9. The apparatus of claim 1 further comprising means for reducing power to the apparatus upon sensing of a lapse of time without operational signals.

10. A method for displaying data selection from preselected ranges by an electrical apparatus having microcomputer processor means, range selection switch input means, momentary switch means, memory means, and output display means, comprisng the steps of:

selecting a range of data for dual simultaneous data selection sequencing operations by actuation of the selection switch input means;

simultaneously sequencing through said data selection sequencing operation in response to said range selection;

terminating said sequencing of the first of said data selection sequencing operations in response to the pushing of said momentary switch means and selecting data therefrom and terminating said sequencing of the second of said data selection sequencing operations in response to the release of said momentary switch means and selecting data therefrom; and displaying said selected data.

11. The method of claim 10 wherein said step of selecting a first range of data comprises sensing the status of inputs to the micro-computer processor means, developing an index corresponding thereto, developing an address for a memory location therefrom, and reading from said memory location the range data.

12. The method of claim 11 further comprising the step of displaying said range data by using said index to develop an address of a memory location, reading the desired display data from said memory location, and directing said display data to output display means.

13. The method of claim 10 wherein said step of displaying said selected data comprises developing an index corresponding to said selected data, developing an address of a memory location corresponding to said index, reading data from said memory location for output to said output display means.

14. The method of claim 10 further comprising the final step of sensing for actuation of the selection switch input means or said momentary switch means during a predefined time delay, and reducing power to the electrical apparatus in the absence of said actuation within said time delay.

15. The method of claim 12 further comprising sequentially strobing the digits of said output display means at a high scan rate to provide a visual impression of continuous display.

16. The method of claim 15 further comprising sequentially cycling through addresses of memory locations and reading the data in said memory locations for controlling the digits of said display means.

17. The method of claim 13 further comprising sequentially strobing the digits of said output display means at a high scan rate to provide a visual impression of continuous display.

18. The method of claim 17 further comprising sequentially cycling through addresses of memory locations and reading the data in said memory locations for controlling the digits of said display means.

* * * * *